United States Patent [19]

Poglitsch

[11] Patent Number: 4,928,376

[45] Date of Patent: May 29, 1990

[54] METHOD FOR FILLING A CAVITY, SUCH AS A SENSOR CAVITY, WITH AN INCOMPRESSIBLE FLUID

[75] Inventor: Lawrence R. Poglitsch, Mt. Prospect, Ill.

[73] Assignee: Motorola Inc., Schaumburg, Ill.

[21] Appl. No.: 387,563

[22] Filed: Jul. 31, 1989

[51] Int. Cl.⁵ .......................... B23P 19/04; B65B 3/04
[52] U.S. Cl. ......................................... 29/530; 29/451;
29/527.1; 29/593; 29/DIG. 44; 73/756; 141/5;
141/59; 141/65
[58] Field of Search ...................... 29/623.2, 458, 450,
29/451, 527.1, 530, 801, 870, 743, DIG. 44,
592.1, 593; 73/706, 718, 720, 721, 726, 727, 756;
427/58, 294, 295, 296, 297, 298; 361/283;
141/4, 5, 59, 65

[56] References Cited

U.S. PATENT DOCUMENTS

| | | | |
|---|---|---|---|
| H606 | 3/1989 | Ahn et al. | 361/283 |
| 4,425,799 | 1/1984 | Pak | 73/718 |
| 4,610,256 | 9/1986 | Wallace | 73/706 X |
| 4,655,700 | 4/1987 | Ahmed | 141/5 X |
| 4,686,764 | 8/1987 | Adams et al. | 29/592.1 |
| 4,697,643 | 10/1987 | Sassier | 73/706 X |
| 4,732,042 | 3/1988 | Adams | 73/706 |
| 4,746,317 | 5/1988 | Kaiser et al. | 141/65 X |
| 4,833,922 | 5/1989 | Friek et al. | 73/706 X |

FOREIGN PATENT DOCUMENTS 49230 3/1987 Japan ....................... 73/706

Primary Examiner—Joseph M./ Gorski
Assistant Examiner—Peter D. B. Vo
Attorney, Agent, or Firm—Phillip H. Melamed

[57] ABSTRACT

A method for oil filling an internal pressure sensor cavity (20) is disclosed which minimizes manufacturing process time and insures totally and properly filling the internal cavity with oil. A predetermined amount of oil (23) is added to a pressure sensor external cavity (21) connected through an opening (22) to an internal sensor cavity (20) having a sensing element (17) therein. A vacuum is drawn while the oil is in the external cavity thus providing at least a partial vacuum in at least the internal cavity. Then vacuum pressure is released causing the oil to be drawn into the internal cavity through the opening. Subsequently a sealing means (27) is force fit in the opening to seal the internal cavity.

24 Claims, 1 Drawing Sheet

U.S. Patent
May 29, 1990
4,928,376
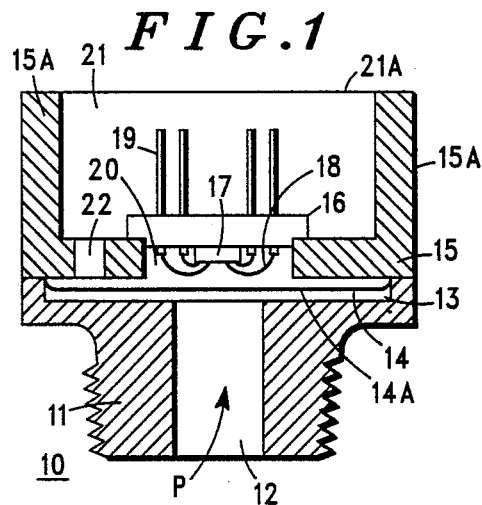
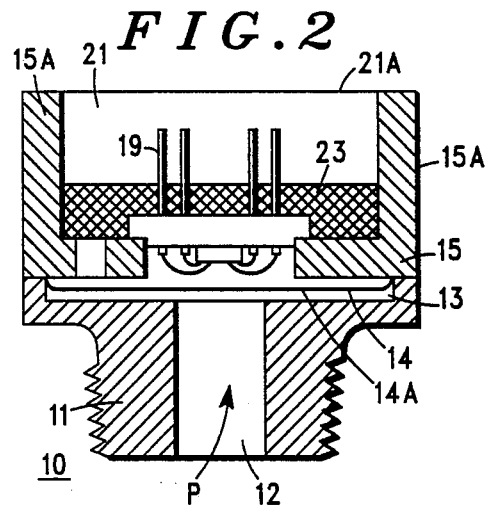
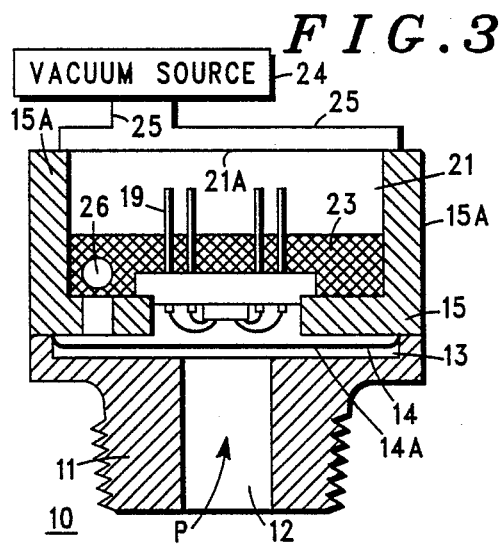
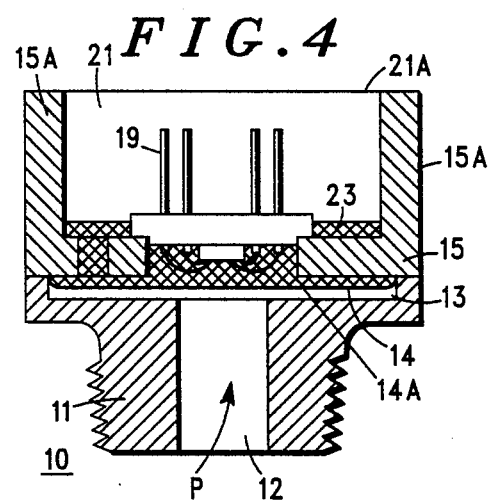
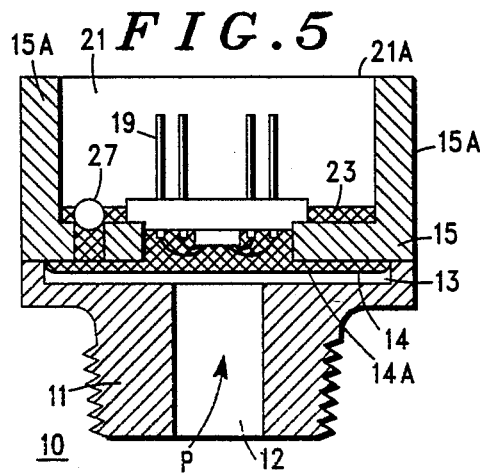
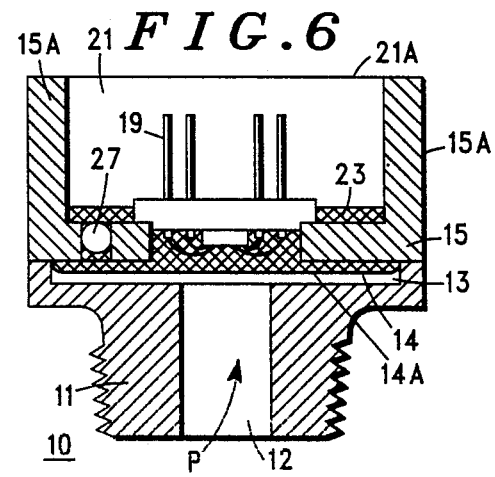

METHOD FOR FILLING A CAVITY, SUCH AS A SENSOR CAVITY, WITH AN INCOMPRESSIBLE FLUID

BACKGROUND OF THE INVENTION

The present invention relates primarily to the field of methods for filling a cavity with an incompressible fluid. While the invention may be utilized for filling any cavity with an incompressible fluid, it is particularly useful for filling a pressure sensor internal cavity with oil.

Some prior pressure sensors have a pressure sensing element in a sealed internal cavity which is filled with an incompressible fluid, such as silicone oil, rather than having the internal cavity filled with air or some other gas. Since typically the internal pressure sensor cavity is small, it may be difficult to completely fill the internal cavity. In addition, it is typically necessary to insure that no air bubbles or other contaminants are contained in the oil in the internal cavity to insure the accuracy of such prior pressure sensors.

U.S. Pat. Nos. 4,732,042 and 4,686,764 and U.S. Statutory Invention Registration H606 all illustrate prior pressure sensors which have a sealed internal sensor cavity filled with an incompressible fluid/gel. Typically, these assemblies are manufactured by a batch processing method comprising evacuating the internal cavities of many different sensors, then providing an incompressible fluid (oil) in or adjacent the internal cavities typically by immersing all of the sensors in a reservoir of incompressible fluid, and then releasing the vacuum such that the incompressible fluid will totally fill the internal cavity. Then, the internal cavity is sealed by some appropriate technique. U.S. Pat. No. 4,686,764 illustrates a filled pressure sensor in which the sealing technique comprises rolling a membrane over an overfilled internal cavity so as to insure total filling of the internal cavity.

All of the prior techniques which utilize immersing the sensor, either totally or partially, in a reservoir of incompressible fluid involve substantial cleanup process steps thereafter since excess fluid should typically be removed from the surfaces of the sensor which do not form the boundaries of the internal cavity. In addition, the batch processing involved in all the prior techniques which use a common reservoir of incompressible fluid for a plurality of sensors, or which simultaneously batch process a large number of sensors in one vacuum chamber, also require a substantial lengthy period for maintaining a vacuum to insure that the vacuum will remove water/moisture and gas pockets (bubbles) contained in the incompressible fluid itself. This can take an appreciable time since either a large quantity of incompressible fluid is required to immerse the plurality of sensors in the fluid and/or since the entire volume of a vacuum chamber containing the fluid and a plurality of sensors must be evacuated to implement a batch processing step. Also, prior sealing techniques for the internal cavity, even those that create a seal by force fitting a sealing ball, either may reintroduce air bubbles and contaminants into the fluid, or may be complex and difficult to implement and are therefore not desired.

SUMMARY OF THE INVENTION

An object of the present invention is to provide an improved cavity filling method which overcomes the deficiencies noted above.

For one embodiment of the present invention, a method for filling a cavity with an incompressible fluid is provided. The method comprises the steps of: providing an external cavity of an assembly fixed to and adjacent to an internal assembly cavity, the internal cavity being sealed except for an opening connecting it to the external cavity; providing a predetermined amount of incompressible fluid in the external cavity; evacuating gas from the external and internal cavities after the fluid is provided in the external cavity and thereby providing at least a partial vacuum in the internal cavity; subsequently releasing vacuum pressure on the external cavity such that the fluid is drawn into the internal sensor cavity through the opening from the external cavity; and subsequently sealing the opening and thereby isolating the external and internal cavities and sealing the internal cavity, whereby the internal cavity is sealed after being filled with the incompressible fluid.

Essentially, the present invention uses an external cavity to store a predetermined amount of incompressible fluid. Then preferably just the external cavity of the assembly is subject to evacuation which removes gas and water/moisture from both the external and internal cavities as well as from the incompressible fluid. This avoids subjecting the atmosphere external and adjacent to the external and internal cavities to vacuum pressure. This evacuation can take place rapidly because only a small volume of incompressible fluid is provided for each assembly and the vacuum may be just applied to the volume of the external and internal cavities and the opening between. This speeds up the manufacturing process and permits inline sequential manufacturing of assemblies rather than requiring batch process manufacturing. The evacuation step can commence after the fluid covers the opening connecting the external and internal cavities. Alternatively, vacuum can commence with the fluid spaced away from the opening, by temporarily tilting the assembly. Vacuum pressure is released while the fluid covers the opening, and the incompressible fluid then fills the internal cavity. Preferably, a slight excess of incompressible fluid remains in the external cavity adjacent to the opening. This allows subsequent sealing of the opening without the introduction of any air bubbles into the internal cavity. Preferably this sealing is accomplished by force fitting a sealing member into the opening. When subsequent cleanup of the sensor assembly is required, only the slight excess amount of incompressible fluid remaining in the external cavity will now have to be removed, thus speeding up the manufacturing process by minimizing the cleanup time required.

The above features and advantages of the present invention, as well as additional features and advantages, are explained more fully in the subsequent detailed description of the preferred embodiment of the present invention. This preferred embodiment shows how to use the present invention to provide a pressure sensor.

BRIEF DESCRIPTION OF DRAWINGS

For a more complete understanding of the invention reference should be made to the drawings, in which:

FIGS. 1 through 6 comprise cross section views of a pressure sensor after various sequential manufacturing process steps implemented in accordance with the present invention.

DESCRIPTION OF THE PREFERRED EMBODIMENTS

Referring to FIG. 1, a pressure sensor 10 is illustrated in cross section wherein the sensor comprises a direct port intake manifold absolute pressure sensor for sensing automobile engine vacuum pressure. The sensor 10 includes a sensor housing comprising an extending threaded sensor body portion 11 having a central passageway 12 which provides a conduit for sensed pressure P external to this sensor with respect to a pressure sensing cavity 13 adjacent a pressure sensing thin flexible diaphragm 14. The sensor housing also includes a support portion 15 to which the threaded sensor body portion 11 and peripheral portions of the flexible diaphragm 14 are mounted. In addition, a pressure sensing element substrate 16 is also mounted to the sensor body portion 15 and has a pressure sensing element 17, such as a semiconductor piezoresistive pressure sensing element, mounted thereon. Wire bonds and/or other electrical interconnections 18 connect the sensing element 17 to external electrical leads 19 which pass through and protrude from the substrate 16 and provide external electrical access to the pressure sensing element 17.

The substrate 16, sensor body portion 15 and a central portion 14A of the diaphragm 14 together form the boundaries of an internal sensor cavity 20 associated with and inside which the pressure sensing element 17 is located. An external cavity 21 is formed by extending portions 15A of the sensor body portion 15. The external cavity 21 is fixed to and adjacent to the internal cavity 20, and is connected to cavity 20 via an opening 22 in the sensor body portion 15. The internal cavity 20 is sealed except for the opening 22.

FIG. 1 illustrates the sensor 10 prior to filling the internal sensor cavity 20 with an incompressible fluid such as silicone oil or some other type of suitable dielectric fluid. Subsequently, the internal cavity 20 will be sealed such that the sensed pressure P, transmitted to the diaphragm 14 via the conduit 12, will cause deflection of the diaphragm 14 in response thereto. When the diaphragm 14 deflects, this will cause suitable pressure transmission to the pressure sensing element 17 via the incompressible fluid to be provided in the cavity 20. This will cause a change in at least one electrical characteristic of the pressure sensing element 17 wherein this change is sensed by circuitry external to the sensor 10 due to the connection of this external circuitry to the leads 19. In general, the operation of such oil filled pressure sensors is well known, and the present invention deals with an improved method for filling sensor cavity 20 with oil. The steps of this method are sequentially illustrated by the FIGS. 1 through 6 which show the sensor 10 after various manufacturing process steps.

Referring to FIG. 1, the external cavity 21 is formed by the extending portion 15A of the sensor body portion 15 such that it has a open end 21A. After the sensor 10, as shown in FIG. 1, is provided, a predetermined amount of incompressible fluid 23, preferably silicone oil, is provided in the external cavity 21 via the open end 21A resulting in the structure shown in FIG. 2. The volume of this predetermined amount of incompressible fluid will be slightly in excess of the combined volume of the internal cavity 20 and the opening 22.

Subsequently, the external cavity 21 of the sensor 10 is connected to a vacuum source 24 via a face seal or tubing connections 25 and air is evacuated from both the external and internal cavities while the fluid 23 is provided in the external cavity. This results in providing at least a partial vacuum in the external and internal cavities, preferably due to the connections 25, without subjecting the ambient atmosphere external and adjacent the external and internal cavities to vacuum pressure. This avoids requiring a batch process manufacturing step and permits a rapid inline sequential manufacturing process for making sensors since only a small volume is now subject to vacuum pressure. This vacuum or evacuation step is generally illustrated in FIG. 3 wherein an air bubble 26 is shown passing from the opening 22, through the fluid 23, to the external cavity 21 during the evacuation step. During the evacuation step, which can commence after the fluid 23 covers the opening 22, essentially the air in the internal cavity 20 will be drawn through the fluid 23. In addition, air bubbles in the fluid 23 and absorbed moisture in the fluid will also be removed due to subjecting the fluid 23 to the vacuum. Commencing the evacuation after the fluid covers the opening means that the fluid can be provided in the external cavity prior to subjecting the external cavity to a vacuum. This speeds up the manufacturing process since fewer steps have to occur while vacuum pressure is being applied. Alternatively, after the fluid 23 is provided in the cavity 21, the sensor can be temporarily tilted slightly to space the fluid away from the opening 22 during the application of vacuum by the source 24. This may be required if the fluid 23 has a high viscosity so as to insure evacuation of the internal cavity 20.

After a sufficient vacuum pressure has been established for a sufficient time duration to insure the removal of air from the internal cavity 20 and air bubbles and water/moisture contamination from the fluid 23, the vacuum pressure is released while the fluid 23 covers the opening 22 such that the fluid 23 is then drawn into the internal sensor cavity 20 through the opening 22 resulting in the sensor structure shown in FIG. 4. Subsequently, as per FIGS. 5 and 6, a sealing ball 25 is force fit into the opening 22 thereby sealing this opening and the internal cavity 20 and isolating the external and internal cavities 21 and 20. While a ball 27 is illustrated as performing the sealing operation, any other type of suitable shape for the sealing mechanism can be utilized to preferably provide a force fit into the opening 22 such that a seal is provided. After the sealing step, as depicted in FIG. 6, any oil 23 which remains in the external cavity 21 can be removed by use of a suitable solvent.

It should be noted that prior to the sealing step shown in FIGS. 5 and 6, a thin layer of oil 23 still remains in the external cavity 21 adjacent the opening 22, and this minimizes the possibility that during the sealing step any air bubbles will be introduced into either the internal cavity 20 or the opening 22. Also, preferably the sealing is accomplished by force fitting of the sealing ball 27 into the opening 22 rather than by a solder seal operation which might introduce contaminants or air bubbles into the fluid 23 in the internal cavity due to the application of excessive heat or flux to the sensor 10 to accomplish the sealing process. However, some advantageous results are achieved, even if a solder seal sealing method is utilized.

By use of the method shown in accompanying figures, a more efficient manufacturing process is achieved since it is much easier to clean up the remaining oil which is not sealed in the internal cavity 20. In prior oil filling techniques, either the entire body of a prior sensor or a substantial portion of the prior sensor was totally immersed in oil to accomplish oil filling of an internal cavity. This resulted in a substantial and time consuming clean up process step after the internal cavity of the prior sensor had been sealed. In addition, the present technique preferably minimizes the possibility of introducing air bubbles or other contaminants into the internal cavity during the sealing process wherein these contaminants would affect the accuracy of the pressure sensor causing it to be erratic and inaccurate. Also, the prior sensor manufacturing techniques typically utilized a large reservoir of incompressible fluid or oil, and then a large number of sensors were essentially batch processed by either immersing all of them, or a substantial portion of each of them into this reservoir during the pulling of a vacuum. This technique is not as efficient as the present technique, since a longer period for maintaining the vacuum would be required to accomplish the prior manufacturing process This is because it would take longer to remove air bubbles and moisture from this large reservoir of oil utilized in the prior manufacturing techniques and to evacuate a large vacuum chamber containing the reservoir and a plurality of sensors. This disadvantage is overcome by the present invention's use of only a small predetermined amount of oil being provided in the external cavity for each of the sensors to be manufactured, and the application of vacuum pressure just to the external cavity 21 of the sensor. This permits rapid inline process manufacturing of sensors rather than batch processing.

While I have shown and described specific embodiments of this invention, further modifications and improvements will occur to those skilled in the art. One such modification could comprise utilizing a separate temporary partition to form the external cavity 21 to contain the fluid prior to the evacuation step, rather than using an integral extension of the sensor body portion 15, which together with the body portion 11 forms a protective housing for the sensing element 17, to form the cavity 21. Another such modification could comprise the utilization of a ceramic capacitive pressure sensing element for the sensing element 17, rather than a piezoresistive semiconductor pressure sensing element. Also, the cavity 20 could comprise part of a capacitive pressure sensor element, rather than having a sensor element being positioned therein. In addition, various aspects of the present invention could be utilized to fluid fill any internal cavity, such as the internal cavity between liquid crystal display (LCD) plates, rather than just oil filling a sensor or pressure sensor internal cavity. All such modifications or improvements which retain the basic underlined principles disclosed and claimed herein are within the scope of this invention.

I claim:

1. A method for filling a sensor cavity with an incompressible fluid comprising the steps of:
   providing an external cavity of a sensor fixed to and adjacent to an internal sensor cavity associated with a sensor element, said internal cavity being sealed except for an opening connecting it to said external cavity;
   providing a predetermined amount of incompressible fluid in said external cavity;
   evacuating gas from said external and internal cavities after said fluid is provided in said external cavity and thereby providing at least a partial vacuum in said internal cavity;
   subsequently releasing vacuum pressure on said external cavity such that said fluid is drawn into said internal sensor cavity through said opening from said external cavity; and
   subsequently sealing said opening and thereby isolating said external and internal cavities and sealing said internal sensor cavity, whereby said internal sensor cavity is sealed after being filled with said incompressible fluid.

2. The method of claim 1 wherein a volume of the predetermined amount of incompressible fluid provided in said external cavity prior to said evacuating step slightly exceeds a volume of said internal sensor cavity and said opening.

3. The method of claim 1 wherein said evacuating step commences while said incompressible fluid covers said opening.

4. The method of claim 1 wherein said evacuating step commences while said incompressible fluid is in said external cavity but is spaced away from said opening, said vacuum releasing step occurring while said fluid covers said opening.

5. The method of claim 1 wherein said evacuating step comprises coupling a vacuum pressure to said external cavity without subjecting atmosphere external and adjacent to said external and internal cavities to the vacuum pressure.

6. The method of claim 1 wherein said sealing step comprises force fitting a sealing member into the opening.

7. The method of claim 6 wherein said sealing member is force fit into said opening while said incompressible fluid remains provided in both said external and internal cavities.

8. The method of claim 1 wherein said incompressible fluid comprises an oil.

9. The method of claim 8 wherein said step of providing said external cavity comprises utilizing an extending portion of a protective housing for said sensor element thereby forming said external cavity, said external cavity having at least one open end through which said incompressible fluid is provided to said external cavity by said fluid providing step.

10. The method of claim, 9 wherein said internal cavity is at least partially formed by a flexible diaphragm, deflection of which alters at least one electrical characteristic of said sensor element.

11. The method of claim 10 wherein said sensor element comprises a pressure sensing element which provides a change in its electrical characteristic in accordance with sensed pressure causing a deflection of said diaphragm.

12. The method of claim 11 wherein said sealing step comprises providing a sealing element in said opening while an amount of said incompressible fluid remains provided in both said external and internal cavities.

13. The method of claim 12 which includes the step of removing, subsequent to said sealing step, any incompressible fluid remaining in said external cavity.

14. A method for filling a cavity with an incompressible fluid comprising the steps of:
   providing an external cavity of an assembly fixed to and adjacent to an internal assembly cavity, said internal cavity being sealed except for an opening connecting it to said external cavity;

providing a predetermined amount of incompressible fluid in said external cavity;

evacuating gas from said external and internal cavities after said fluid is provided in said external cavity and thereby providing at least a partial vacuum in said internal cavity;

subsequently releasing vacuum pressure on said external cavity such that said fluid is drawn into said internal cavity through said opening from said external cavity; and subsequently sealing said opening and thereby isolating said external and internal cavities and sealing said internal cavity, whereby said internal cavity is sealed after being filled with said incompressible fluid.

15. The method of claim 14 wherein a volume of the predetermined amount of incompressible fluid provided in said external cavity prior to said evacuating step slightly exceeds a volume of said internal cavity and said opening.

16. The method of claim 14 wherein said evacuating step commences while said incompressible fluid covers said opening.

17. The method of claim 14 wherein said evacuating step commences while said incompressible fluid is in said external cavity but is spaced away from said opening, said vacuum releasing step occurring while said fluid covers said opening.

18. The method of claim 14 wherein said evacuating step comprises coupling a vacuum pressure to said external cavity without subjecting atmosphere external and adjacent to said external and internal cavities to the vacuum pressure.

19. The method of claim 14 wherein said incompressible fluid comprises an oil.

20. The method of claim 19 wherein said step of providing said external cavity comprises utilizing an extending portion of a protective housing for said internal cavity thereby forming said external cavity, said external cavity having at least one open end through which said incompressible fluid is provided to said external cavity by said fluid providing step.

21. The method of claim 14 wherein said sealing step comprises providing a sealing element in said opening while an amount of said incompressible fluid remains provided in both said external and internal cavities.

22. The method of claim 21 which includes the step of removing, subsequent to said sealing step, any incompressible fluid remaining in said external cavity.

23. The method of claim 14 wherein the said sealing step comprises force fitting a sealing member into the opening.

24. The method of claim 23 wherein said sealing member is force fit into said opening while said incompressible fluid remains provided in both said external and internal cavities.

* * * * *